United States Patent
Ryan

(10) Patent No.: US 7,502,817 B2
(45) Date of Patent: Mar. 10, 2009

(54) METHOD AND APPARATUS FOR PARTITIONING MEMORY IN A TELECOMMUNICATION DEVICE

(75) Inventor: Chris Ryan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1011 days.

(21) Appl. No.: 10/032,957

(22) Filed: Oct. 26, 2001

(65) Prior Publication Data

US 2003/0084194 A1 May 1, 2003

(51) Int. Cl.
G06F 15/16 (2006.01)
G06F 1/00 (2006.01)
G06F 1/26 (2006.01)
G06F 1/32 (2006.01)
G06F 11/30 (2006.01)
H04M 1/00 (2006.01)
H04Q 7/20 (2006.01)
H04B 1/38 (2006.01)
H04B 1/06 (2006.01)
H04B 1/04 (2006.01)
H01Q 11/12 (2006.01)

(52) U.S. Cl. ............... 709/200; 709/250; 455/550.1; 455/556.1; 455/450; 455/556.2; 455/574; 455/343.1; 455/343.2; 455/343.3; 455/343.4; 455/343.5; 455/343.6; 455/127.1; 455/127.2; 455/127.3; 455/127.4; 455/127.5; 713/300; 713/320; 713/322; 713/323; 713/324; 713/330; 713/340

(58) Field of Classification Search .......... None
See application file for complete search history.

(56) References Cited

U.S. PATENT DOCUMENTS

| 5,841,431 | A | * | 11/1998 | Simmers | 345/211 |
| 6,018,232 | A | | 1/2000 | Nelson et al. | 320/127 |
| 6,105,141 | A | | 8/2000 | Hanlon et al. | 713/323 |
| 6,161,162 | A | * | 12/2000 | DeRoo et al. | 710/244 |
| 6,289,464 | B1 | | 9/2001 | Wecker et al. | 713/300 |

(Continued)

FOREIGN PATENT DOCUMENTS

EP 0628908 12/1998

(Continued)

*Primary Examiner*—Hassan Phillips
(74) *Attorney, Agent, or Firm*—Howard Seo; Abdollah Katbab

(57) ABSTRACT

An apparatus and method are disclosed for partitioning and downloading executable memory images in low-powered computing devices comprised of multiple processors and a mobile station modem. The general computing subsystem 102 handles tasks generally related to a personal digital assistant (PDA) as well as activating the modem computer subsystem 104 and one or more shared memory modules 108-110. The modem computing subsystem 104 handles tasks associated with a mobile station modem. Power is conserved by not clocking the modem computer system 104 and the shared memory 108-110 during times when modem functions are not needed. The shared memory modules 108-110 are loaded with a binary memory image for use by the modem computer subsystem 104 from a memory 222 under control of the general computing subsystem 102. When needed, the modem computing subsystem 104 is activated to monitor a paging channel, and disabled when it is no longer desired to monitor the paging channel. Additionally, a second shared memory 110 may be activated and used only when the modem computing system 104 needs to manage a traffic channel.

42 Claims, 4 Drawing Sheets

U.S. PATENT DOCUMENTS

| | | | |
|---|---|---|---|
| 6,526,322 B1 * | 2/2003 | Peng et al. | 700/5 |
| 6,546,496 B1 * | 4/2003 | Wang et al. | 713/322 |
| 6,754,509 B1 * | 6/2004 | Khan et al. | 455/556.1 |
| 6,832,327 B1 * | 12/2004 | Magro et al. | 713/500 |
| 6,920,572 B2 * | 7/2005 | Nguyen et al. | 713/322 |
| 6,965,974 B1 * | 11/2005 | Bays et al. | 711/153 |
| 2003/0008690 A1 * | 1/2003 | Guterman | 455/574 |

FOREIGN PATENT DOCUMENTS

| | | |
|---|---|---|
| WO | 0161872 | 8/2001 |

* cited by examiner

METHOD AND APPARATUS FOR PARTITIONING MEMORY IN A TELECOMMUNICATION DEVICE

FIELD OF THE INVENTION

The present invention is related generally to telecommunication and, more specifically, to a technique for partitioning memory to conserve power in telecommunication devices.

BACKGROUND OF THE INVENTION

Wireless telecommunication devices are evolving to contain increased functionality and complexity. This increased functionality often brings together functions that have been traditionally been provided by different devices such as cell phones and personal digital assistants (PDA). The combination of these functions typically require increased processor capability as well as increased power requirements. The requirement for additional processing capability to add functionality and minimize latency is especially important when the information must be processed in real time, as for example in cell phones. Having more processing capability and in turn higher power consumption, is especially problematic in wireless communication systems where it is inconvenient to connect to power sources.

Wireless communication systems generally must contain their own source of power, which often is in the form of a battery. Users typically need the ability to operate such systems for longer periods of time without the need to recharge or swap batteries or even connect to line power. However, such longer operating times normally require an increase in battery size, which leads to undesirable effects such as heavier batteries, increased expense, and environmental concerns regarding disposal of used batteries.

To meet the needs of increased processing power within wireless communication devices, additional processors requiring more memory and power were added to devices. A general purpose processor handles most system tasks and a modem computing subsystem handles tasks related to handling mobile station requirements. Mobile station modem binary software images (i.e., contents of memory) are programmed at the time of manufacture into read-only memory (ROM) as a single contiguous binary image. The modem computing subsystem directly executes the memory image from ROM, which results in slower execution than images executed from memories with faster access times, such as random access memory (RAM). At system boot time (e.g., when the wireless device is powered-up), read-write and zero-initialized data are copied to RAM prior to execution of code by the modem computing subsystem. No part of the over-the-air standards as implemented in the software binary image can be executed prior to completion of system boot and initiation of the operating system. All system memory must be completely powered-up prior to mobile station modem operation of the over-the-air standard. This approach results in wasting significant amounts of power because the modem computer subsystem had to be powered up even when not in use.

Therefore, it can be appreciated that there is a significant need for a system and method to minimize power consumption in a wireless communication system while increasing the speed and functionality of the device for the user. The present invention provides this and other advantages that will be apparent from the following detailed description and accompanying figures.

SUMMARY OF THE INVENTION

The present invention is embodied in a method and apparatus for partitioning and downloading executable memory images in low-powered computing devices comprised of multiple processors and a mobile station modem. In one embodiment, the system comprises a communications-related personal digital assistant (PDA) that contains two computer subsystems. The general computing subsystem handles tasks generally related to a PDA as well as gating independently the clock that activates the modem computer subsystem and one or more shared memory modules. The modem computing subsystem handles tasks associated with a mobile station modem. The system is able to conserve power by not clocking the modem computer system and the shared memory during times when the modem function is not needed. The shared memory modules are loaded with a binary memory image for use by the modem computer subsystem from a nonvolatile memory by the general computing subsystem.

In another embodiment, the system boots the general computing subsystem, which contains a nonvolatile memory, boots the modem computing subsystem when it is desired to monitor a paging channel, and disables the modem computing system to conserve power when it is no longer desired to monitor the paging channel. This embodiment may enable the modem computing system by providing a clock to the first shared memory module, loading the shared memory module with a binary memory image based on information stored in the nonvolatile memory, providing a clock to activate the modem computing subsystem, and vectoring the processor so that it executes instructions from the binary memory image stored on the shared memory module. The modem computing subsystem may be deactivated to save power when the modem function is not necessary. Additionally, a second shared memory may be activated and used only when the modem computing system needs to manage a traffic channel.

DETAILED DESCRIPTION OF THE PREFERRED EMBODIMENTS

The present invention permits the independent activation and deactivation of portions of a low-powered telecommunication and computing device that are only required in the course of transmitting and receiving data. In an exemplary embodiment, the present invention is implemented using a wireless modem station operating in conjunction with a personal digital assistant (PDA). The combination device may be referred to as a mobile unit, cellular telephone, communicator, or the like. As will be discussed in greater detail below, the present invention is not limited to a specific form of mobile communication device, nor is it limited to a particular over-the-air standard.

Figure 1:
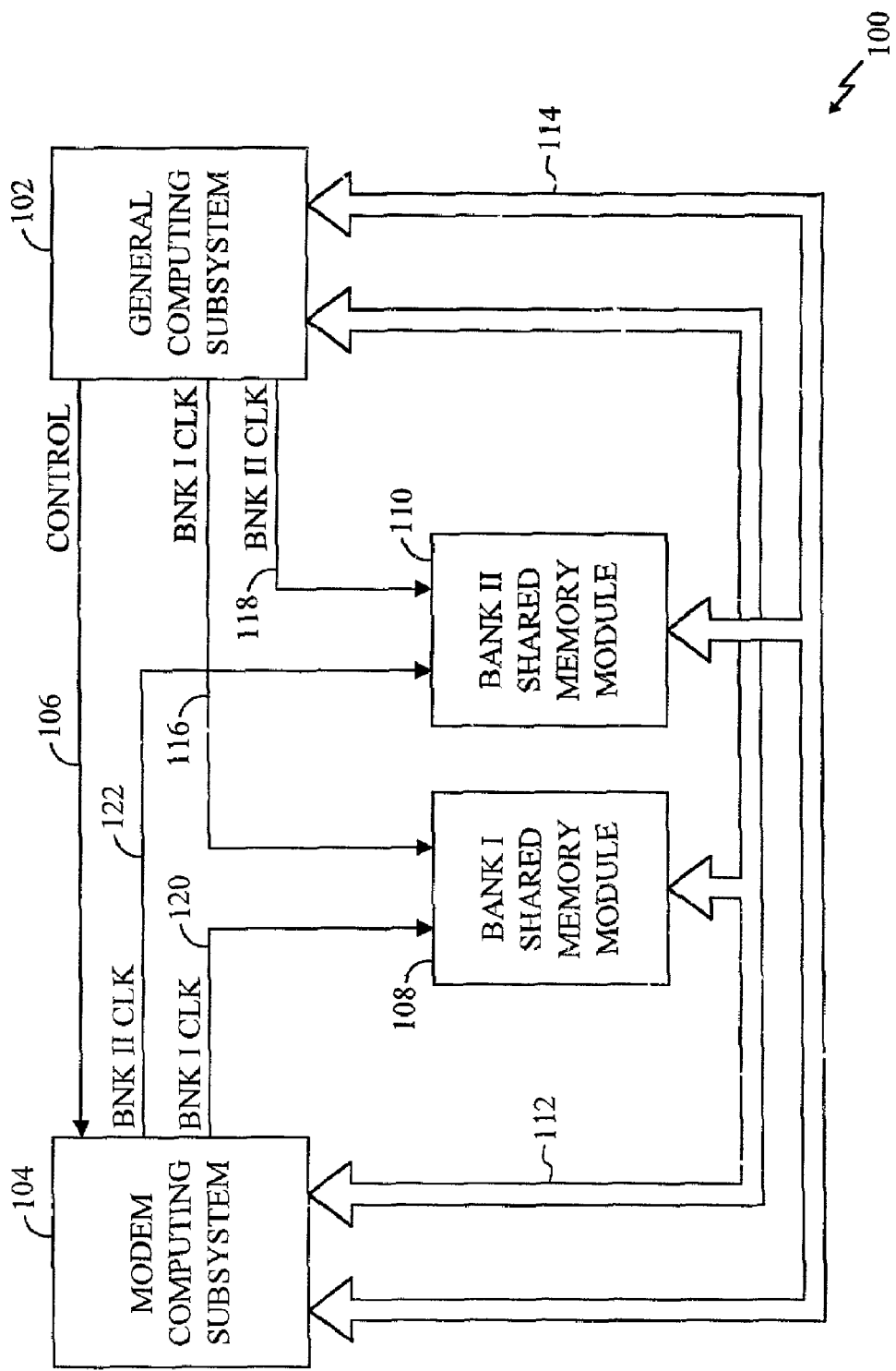
FIG. 1 is a top-level block diagram of the present invention.

The present invention is embodied in a system 100, which is illustrated in the block diagram of FIG. 1. The system 100 includes a general computing subsystem 102 and a modem computing subsystem 104, which will be described in greater detail below.

The general computing subsystem 102 provides control lines 106 that are used to activate, synchronize, and deactivate the modem computing subsystem 104. Both the general computing subsystem 102 and the modem computing subsystem 104 may alternately assert or remove a clock signal to a shared memory modules Bank I 108 and Bank II 110 in the course of activating modem functions. The shared memory modules 108-110 are loaded by the general computing subsystem 102 and contain an executable binary memory image for use by the modem computing subsystem 104. The executable binary memory image comprises instructions and data that the processor of the modem computing subsystem 104 will execute and manipulate. A bus 112 is used to load and access the shared memory module 108, and a bus 114 is used to load and access the shared memory module 110. The general computing subsystem 102 generates clock signals BNK I CLK 116 and BNK II CLK 118, respectively to control the operation of the memory modules 108-110, respectively. Similarly, the modem computing subsystem 104 generates clock signals BNK I CLK 120 and BNK II CLK 122 to control operation of the memory modules 108-110, respectively. The operation of the clock signals 116-122 to control the memory modules 108-110 is discussed in greater detail below.

Figure 2:
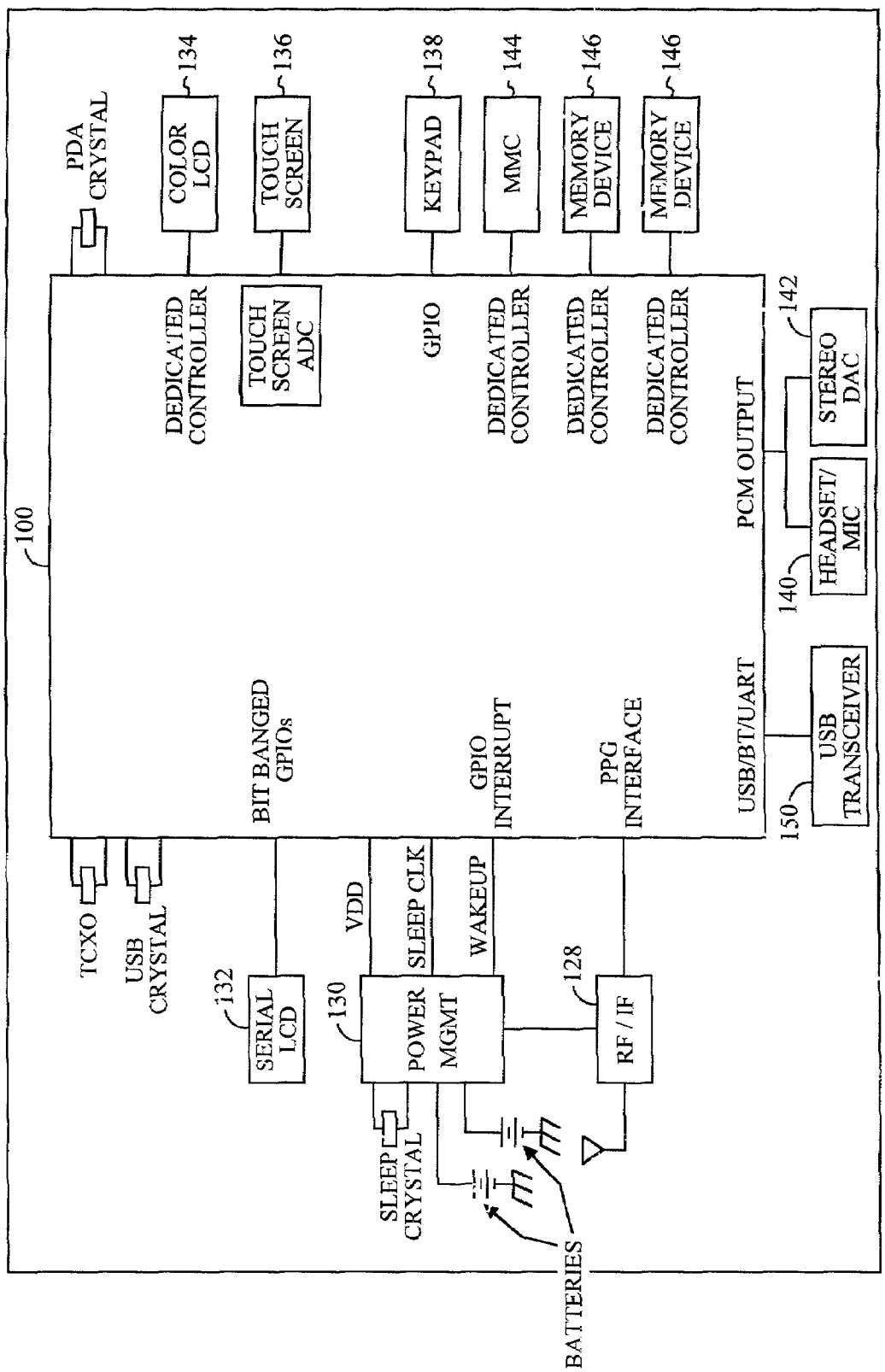
FIG. 2 is a functional block diagram of exemplary interfaces of the present invention.

FIG. 2 is a functional block diagram of exemplary interfaces of the present invention. It will be apparent to one skilled in the art that each of the interfaces of system 100 may be directed to the general computing subsystem 102 and the modem computing subsystem 104 either operating together or alone depending on how the functionality of each the interface is used and when the functionality is needed. In one embodiment interfaces that are needed to operate the PDA in general are classified as a PDA peripherals 220 and interfaces that are only needed during operation of the modem computing subsystem 104 are classified as modem peripherals 244.

The system 100, which typically embodies the functions of both a computing device, such as a PDA and a wireless communicator, includes a transceiver and antenna 128 to allow transmission and reception of data, such as audio communications, between the system 100 and a remote location, such as a cell site controller (not shown). The remote location may host data and communications services such as voice, data, email and internet connections. The operation of the wireless voice and data communications is well known in the art and need not be described herein except as it relates specifically to the present invention.

Preferably, system 100 comprises a power management device 130 that comprises a rechargeable battery and that provides a power supply. System 100 operates in different operational modes with each operational mode having a different level of power consumption, including "Fully Active" wherein the PDA is active and a voice call is in progress, "PDA Active" wherein the PDA is active and the modem and modem functions are asleep, "Phone Active" wherein the PDA is asleep and a voice call is in progress, "Sleep" wherein the PDA is asleep, no voice call, and slotted paging mode is active, and "Deep Sleep" wherein the PDA is asleep and the phone is off. Those skilled in the art will appreciate that a "voice" call can comprehend the functionality of an active traffic channel (including data traffic), and that in the slotted paging mode the modem processor periodically listens to transmissions from a base station to determine if there is an incoming call. It can be readily seen that other combinations of functionality and power consumption are possible. The power management device 130 also may include a sleep timer to awaken the system 100 after a predefined time interval.

The system comprises human interfaces for providing information to and receiving information from users. Visual indicators such as a serial liquid crystal display (LCD) 132, a color liquid crystal display 134, and light-emitting diodes (not shown) are used to rapidly convey information to the user. Tactile receptors such as a touch screen 130 and keypad 138 allow the user to enter data and commands and to manually respond to system queries. It is apparent to those skilled in the art that other display types and input devices may be used acceptably. Audio input and output, provided by headset/mic 140 and stereo digital-to-analog converter (DAC) 142, allow for two-way communication, as well as command input by using voice recognition, and aural responses to user input. Ideally, the human interfaces and physical system design will be presented in a pleasing and ergonomic fashion so as to provide for ease-of-use of the device.

Interfaces are provided to allow for expandability, such as a multimedia card (MMC) slot 144, and one or more memory expansion slots 146. Communication between the system 100 and other computers or devices can be accomplished via a serial port 150, which is preferably a universal serial bus (USB) transceiver. JTAG-type (Joint Test Action Group) boundary scan testing may also be provided.

Figure 3:
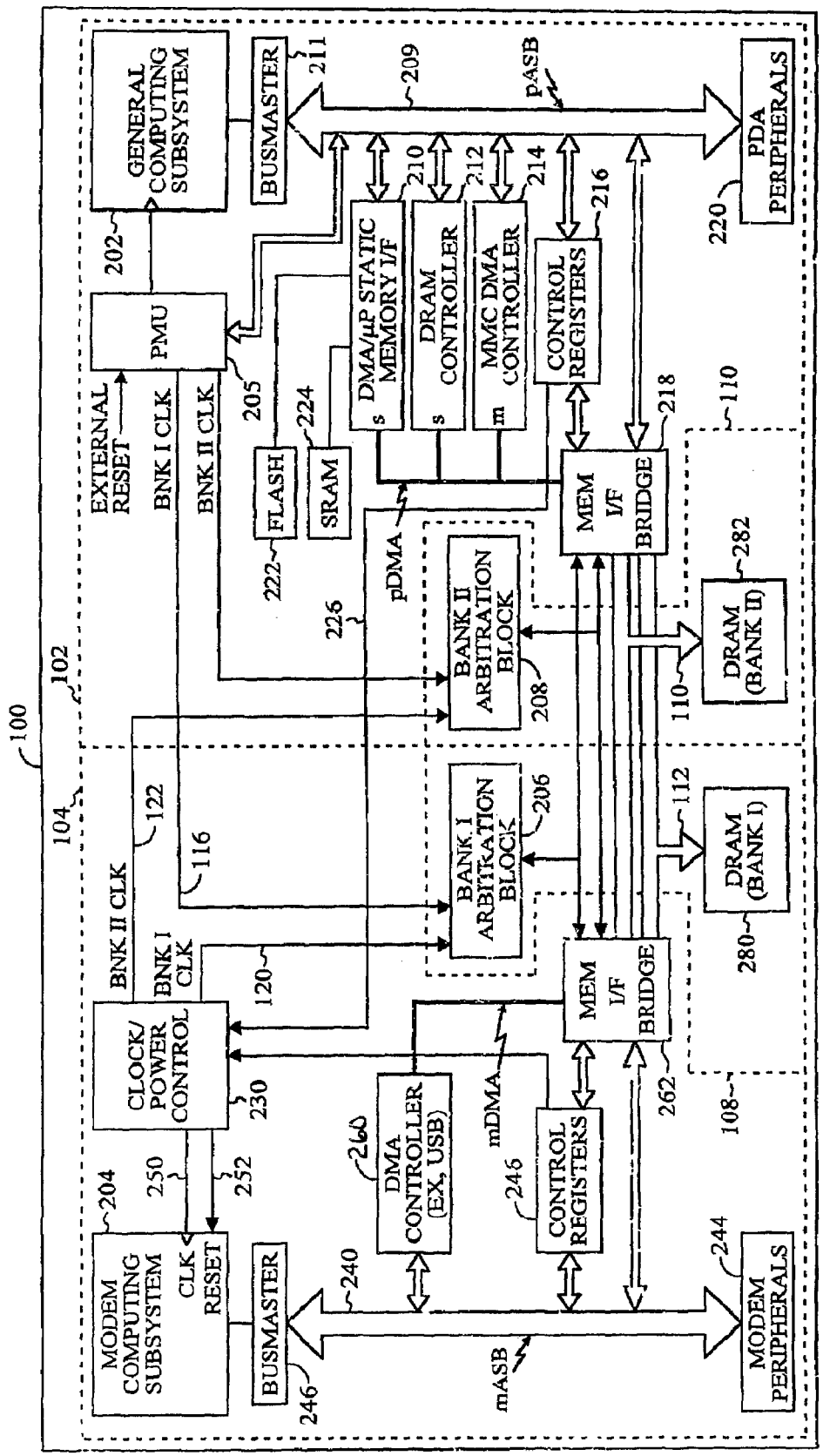
FIG. 3 is a detailed functional block diagram of the system.

FIG. 3 is a detailed functional block diagram according to the invention. The general computing subsystem 102 and the modem computing subsystem 104 are controlled by a general system microprocessor 202 and a modem subsystem processor 204, respectively. Those skilled in the art will appreciate that the term "processor" is intended to encompass any processing device, alone or in combination with other devices, that is capable of operating the telecommunication system. This includes microprocessors, embedded controllers, application specific integrated circuits (ASICs), digital signal processors (DSPs), state machines, dedicated discrete hardware, and the like. The present invention is not limited by the specific hardware component selected to implement the processors 202 and 204.

The general computing subsystem 102 comprises a power management unit (PMU) 205 that receives as an input an external reset signal. This signal may be derived from a power-up circuit, an external reset button, or a sleep timer. The PMU 205 provides a clock to the general subsystem processor 102 as well as bank arbitration blocks 206 and 208 of the shared memory modules 108 and 110, respectively. The PMU 205 may be programmed by and provide status data to the general computing subsystem processor 202 via a general computing subsystem bus 209.

Subsystem bus 209 may include a power bus, a control signal bus, and a status signal bus in addition to a data bus. However, for the sake of clarity the various buses are illustrated in FIG. 3 as the subsystem bus 209. The subsystem bus 209 allows the general computing subsystem processor 202 to receive and send data to nonvolatile memory 222 and static RAM (SRAM) 224, to control registers 216, to the shared memory modules Bank I 108 and Bank II 110, and to PDA peripherals 220. A busmaster 211 provides additional logic for bus interface control logic as well as electrical buffering of signals on subsystem bus 209.

To conserve power and offload processing requirements of the general computing subsystem processor 202, a DMA (direct memory access) channel is provided to transfer data without processor intervention. DMA technology is well known in the art and need not be discussed here. A DMA/microprocessor memory interface 210, DRAM controller 212, and MMC DMA Controller 214 are provided to allow direct memory access of the shared memory modules 108 and 110 by the general subsystem processor 202 and the PDA peripherals 220 via the memory interface bridge 218. The MMC DMA Controller 214 may be configured as the DMA master and the DRAM controller 212 and MMC DMA Controller 214 are configured as slaves.

The DMA/microprocessor memory interface 210 also serves to allow proper access to the nonvolatile memory 222 and SRAM 224 by the general computing subsystem processor 102. In typical embodiments nonvolatile memory 222 is a memory such as flash ram that is preprogrammed with boot code, operating instructions, and data for both the general computing subsystem processor 202 and the modem computing subsystem processor 204. A portion of the memory contents of nonvolatile memory 222 may optionally be stored and accessed according to well known data compression techniques for the purpose of reducing the amount of nonvolatile memory required. The data and instructions required for the operation of the modem computing subsystem processor 204 are copied from nonvolatile memory 222 and stored in SRAM 224, which has lower access times than that of a nonvolatile memory thus permitting faster execution by the modem computing subsystem processor 204.

The modem computing subsystem 104 comprises a clock/power control unit 230 that provides clocks 120-122 to the bank arbitration blocks 206 and 208 of the shared memory modules 108-110, respectively, and provides a clock 250 and a reset line 252 to the modem subsystem processor 204. The clock/power control unit 230 is used to conserve power by gating (i.e., shutting off) the clock 250 to the modem subsystem processor 204 and the clocks 116-122 to the shared memory modules 108-110, respectively, during times when these modules are not needed for operation of the modem portion of the system 100.

When the modem system processor 204 is needed in one embodiment, clock 250 will be applied to the modem subsystem processor 204, and clock 116 from the general computing subsystem 102 is applied so that the Bank I shared memory module 110 may be loaded by the general computing subsystem 102. The clock 116 is maintained so as to allow the data stored in the module 110 to be refreshed. The modem computing subsystem 104 may access the module 110 by asserting clock 120. The modem computing subsystem 104 may access the Bank II shared memory module 112 by asserting clock 122, which may be used to keep the data stored in module 112 refreshed after the data is stored therein by the general modem computing subsystem 102. The general modem computing subsystem 102 may access the module 112 by asserting clock 118.

The general computing subsystem 102 uses the control registers 216 to signal a clock/power control unit 230 to supply the clocks 120-122 to the shared memory module 108 so that the boot code for modem computing subsystem 104 may be stored and retained in the shared memory module 108. The control registers 216 also are used to reset and start the modem computing subsystem processor 204, which will then access the boot code in the shared memory module 108.

In one embodiment, the modem subsystem processor 204 communicates with the general computing subsystem processor 202 via shared memory modules 108-110 by using locations in memory to store information about the status and mode of operation of the modem computing subsystem 104. The general computing subsystem processor 102 polls the status information and signals the clock/power control unit 230 to assert and remove the clocks 120-122, as well as to load portions of the shared memory modules 108-110. Alternatively, the modem subsystem processor 204 may signal the general computing subsystem processor 202 using, by way of example, a vectored interrupt method to instruct the general computing subsystem processor 202 to, for example, load a portion of the shared memory modules 108-110.

A subsystem bus 240 allows the modem computing subsystem processor 204 to receive and send data to control registers 242, to the shared memory modules 108-110, and to modem peripherals 244. The subsystem bus 240 may include a power bus, a control signal bus, and a status signal bus in addition to a data bus. However, for the sake of clarity the various buses as the subsystem bus 240. A busmaster 246 provides additional logic for bus interface control logic as well as electrical buffering of signals on subsystem bus 240.

To conserve power and offload processing requirements of the modem computing subsystem processor 204, a DMA channel is provided to transfer data without processor intervention. A DMA Controller/microprocessor memory interface 260 is provided to allow direct memory access of the shared memory modules 108-110 by the modem subsystem processor 204 and the modem peripherals 244 via a memory interface bridge 262.

The modem computing subsystem 104 uses the control registers 242 to signal the clock/power control unit 230 to supply clock pulses via clock 120 to the shared memory module 110 so that the modem operational software image for modem computing subsystem 104 may be stored and retained in the shared memory module 110. This will typically occur prior to the modem computing subsystem 104 leaving the slotted paging mode and entering the traffic mode. The control registers 216 also are used to signal the clock/power control unit 230 via signal 226 to remove the clock 122 from the shared memory module 110 when the modem computing subsystem 300 reverts to the slotted paging mode from the traffic mode.

The shared memory modules 108-110 each comprise one or more dynamic RAMS 280 and 282, respectively, so that power is conserved when the memory is not clocked. As an additional benefit, the cost of the DRAM is less than that required for static RAM. The shared module 108 is used for storing the boot code of the modem subsystem processor 204 and the software necessary for operating the modem computing subsystem 104 when the wireless device is operating in the slotted paging mode. The shared memory module 110 is used for storing the software necessary for operating the modem computing subsystem 104 when the wireless device is operating in the traffic mode. It will be apparent to those skilled in the art that other shared memory modules may be used to further partition the memory image so that the additional memory banks need only be activated during certain modes that would be associated with the code stored in the additional banks.

The bank arbitration blocks 206 and 208 each receive clocks (i.e., the clocks 116-122) from the general computing subsystem 102 and the modem computing subsystem 104 because the subsystem processors (i.e., the general subsystem processor 202 and the modem subsystem processor 204) are not necessarily synchronized, the bank arbitration blocks 206-208 must be capable of handling the protocols of memory requests from systems having unrelated clocks. The arbitration blocks 206 and 208 each must not only handle unrelated clocks, but also be capable of handling simultaneous and nearly simultaneous requests from both subsystems. The arbitration blocks 206 and 208 receive the requests via the memory interface bridges 218 and 262, resolve any contention between the subsystems, synchronize the local clocks to the subsystem having priority, and respond via the appropriate memory interface bridge to the subsystem having priority. Such arbitration techniques are well known in the art and need not be described in greater detail herein.

Figure 4:
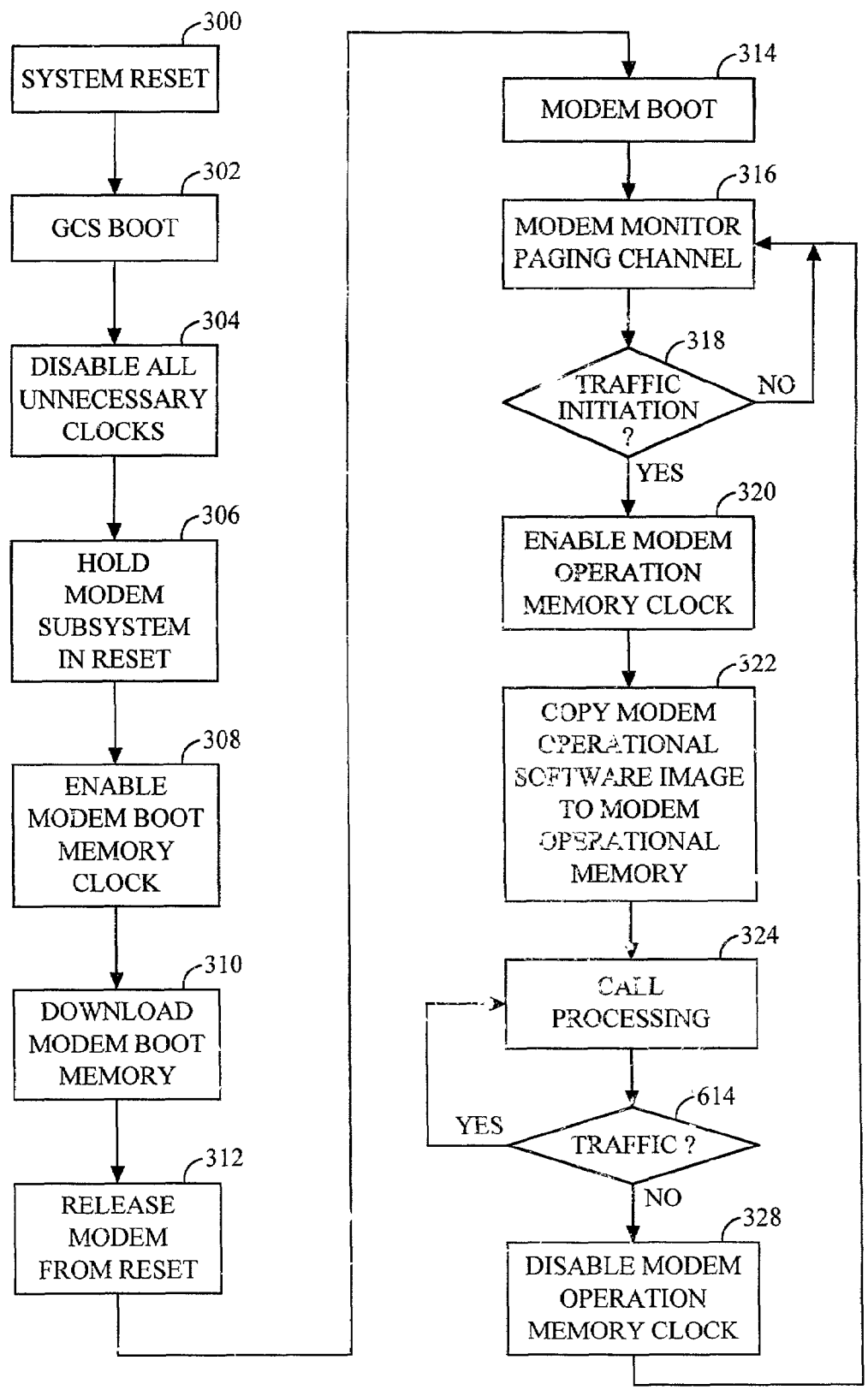
FIG. 4 is a flow chart illustrating an example of the processing steps of the present invention.

FIG. 4 is a flowchart illustrating the operation of a low-powered telecommunication and computing device according to the present invention. These steps are performed by the device as it is powered up and enters various modes.

Specifically, in step 300, a general computing subsystem reset occurs either upon applying power to the system 100, or at anytime when requested. The general computing subsystem reset may be applied during any step described herein, although this capability has been omitted from the flowchart of FIG. 4 for the sake of clarity. After reset, the general computing subsystem 102 boots in step 3j02. To conserve power, in step 304 all unnecessary clocks are disabled, including the clocks (e.g., the clocks 120-122 and the clock 250) in the modem computing subsystem 104. The modem computing subsystem 104 is placed in a reset mode in step 306.

In step 308, the general computing subsystem 102 applies a clock (i.e., the clock 118) to shared memory module 110. A software memory image necessary for the operation of the modem computing subsystem 104 to boot and enter and maintain the slotted paging mode is loaded into the shared memory module 108 in step 310. The modem computing subsystem 104 is released from reset in step 312, and then boots in step 314 using instructions and data from the memory image stored in the shared memory module 108. The modem computing subsystem 104 enters the slotted paging mode in step 316 and monitors the paging channel until, in decision 318, a request for traffic is detected (for incoming requests) or posted (for outgoing requests).

Upon such a request, in step 320, the general computing subsystem 102 applies the clock 116 to the shared memory module 110. A software memory image necessary for the modem computing subsystem 104 to operate a traffic channel for voice, data, or SMS is loaded into the shared memory module 110 in step 322. When the memory image is loaded, in step 324 the modem subsystem processor 204 accesses the contents of the shared memory module 110 for code and data necessary to facilitate a traffic channel. In decision 326, the modem subsystem processor 204 determines whether traffic is present and, if so continues in step 324, else continues on to step 328, where the clocks to the shared memory module 110 are removed and the modem computing subsystem 104 then returns to step 316 where the slotted paging mode is again reentered. Thus, the system 100 provides increased computing and data processing capability while controlling circuitry to reduce power consumption.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for partitioning and loading data in a low-powered communication device, the system comprising:
   a general computing subsystem;
   a modem computing subsystem in communication with the general computing subsystem;
   a shared memory module for receiving a binary data, wherein the shared memory module is accessed by the general computing subsystem and the modem computing subsystem independently;
   a first clock operable to provide the general computing subsystem access to the shared memory module;
   a second clock operable to be selectively activated by the general computing subsystem to the shared memory module to permit use of the shared memory module by the modem computing subsystem; and
   a clock and power control unit disposed in the modem computing subsystem and operable to gate clocking within the modem computing subsystem and to the shared memory module when modem functionality is not enabled.

2. The system of claim 1 wherein the modem computing subsystem controls data processing in accordance with wireless communication protocols.

3. The system of claim 2 wherein the modem computing subsystem further comprises a mobile station wireless modem.

4. The system of claim 1 wherein the general computing subsystem further comprises a nonvolatile memory that stores information for generating the data.

5. The system of claim 4 wherein the general computing subsystem loads the data into the shared memory module.

6. The system of claim 4 wherein the general computing subsystem generates the data from compressed information stored in the nonvolatile memory.

7. The system of claim 1 wherein the general computing system further comprises a general system processor and a power management unit, wherein the power management unit provides clocking to the general computing subsystem processor and the shared memory module.

8. The system of claim 7 wherein the modem computing subsystem further comprises a modem subsystem processor, and wherein the clock and power control unit is further operable to gate clocking to the modem subsystem processor and to the shared memory module when modem functionality is not enabled.

9. The system of claim 1 wherein the shared memory module further comprises at least one arbitration block operable to receive unrelated clock signals from the general computing subsystem and the modem computing subsystem.

10. The system of claim 9 wherein the shared memory module further comprises at least one Dynamic Random Access Memory (DRAM), each DRAM corresponding to an arbitration block, wherein the DRAM is operable to conserve power when the memory is not clocked.

11. A portable wireless communication device, the device comprising:
    a nonvolatile memory;
    a general computing subsystem having access to the nonvolatile memory;
    a modem computing subsystem selectively enabled and disabled by the general computing subsystem;
    a first shared memory module independently accessible by the general computing subsystem and the modem computing subsystem, the first shared memory module being selectively enabled and disabled by the general computing subsystem;
    a first binary image that is loaded in the first shared memory module from the nonvolatile memory by the general computing subsystem when selectively enabled, and is accessible by the modem computing system to configure the modem computing subsystem; and
    a clock and power control unit in the modem computing subsystem and operable to gate clocking within the modem computing subsystem and to the shared memory module when modem functionality is not enabled.

12. The device of claim 11 wherein the first binary memory image comprises mobile station modem code sufficient to permit the modem computing subsystem to establish a wireless communication link and monitor a paging channel.

13. The device of claim 12, wherein the modem computing subsystem and the first shared memory module are enabled when the computing subsystem starts to monitor the paging channel, and the modem computing subsystem and the first shared memory module are disabled when not engaged in wireless communication.

14. The device of claim 12, further comprising a second shared memory module, wherein the second shared memory module is independently accessible by the general computing subsystem and the modem computing subsystem, wherein the second shared memory module can be disabled by the general computing subsystem to save power, and wherein a second binary memory image is loaded in the second shared memory module from the nonvolatile memory by the general computing subsystem.

15. The device of claim 14, wherein the second binary memory image contains the mobile station modem code sufficient to operate a traffic channel.

16. The device of claim 15, wherein the second shared memory module is activated when the modem computing subsystem operates a traffic channel, and the second memory module is deactivated to save power when ceasing to operate the traffic channel.

17. The device of claim 14 wherein the first and second shared memory modules further each comprise at least one arbitration block operable to receive unrelated clock signals from the general computing subsystem and the modem computing subsystem.

18. The device of claim 17 wherein the first and second shared memory modules further each comprise at least one Dynamic Random Access Memory (DRAM), each DRAM corresponding to an arbitration block, wherein the DRAM is operable to conserve power when the memory is not clocked.

19. The device of claim 11 wherein the general computing system further comprises a general system processor and a power management unit, wherein the power management unit provides clocking to the general computing subsystem processor and the shared memory module.

20. The device of claim 19 wherein the modem computing subsystem further comprises a modem subsystem processor, and wherein the clock and power control unit is further operable to gate clocking to the modem subsystem processor and to the shared memory module when modem functionality is not enabled.

21. A system for partitioning and loading data in a communication device, the system comprising:
    means for general computing;
    means for modem computing in communication with the means for general computing;
    means for receiving a binary data, wherein the means for receiving the binary data is accessed by the means for general computing and the means for modem computing independently;
    means for providing the means for general computing with access to the means for receiving the binary data;
    means for permitting use of the means for receiving the binary data by the means for modem computing, wherein the means for permitting use is selectively activated by the means for general computing; and
    means for gating clocking within the means for modem computing and to the means for receiving the binary data when modem functionality is not enabled.

22. A method for partitioning and loading data in a communication device, comprising:
    receiving a binary data;
    independently accessing the binary data by a general computing subsystem and a modem computing subsystem, wherein the modem computing subsystem is in communication with the general computing subsystem;
    providing the general computing subsystem with access to the binary data according to a first clock;
    selectively activating a second clock by the general computing subsystem to permit use of the binary data by the modem computing subsystem; and
    gating clocking within the modem computing subsystem and to the binary data when modem functionality is not enabled.

23. The method of claim 22, further comprising controlling data processing in accordance with wireless communication protocols.

24. The method of claim 23, wherein the modem computing subsystem further comprises a mobile station wireless modem.

25. The method of claim 22, wherein the general computing subsystem further comprises a nonvolatile memory that stores information for generating the data.

26. The method of claim 25, further comprising loading the binary data into the shared memory module.

27. The method of claim 25, further comprising generating the binary data from compressed information stored in the nonvolatile memory.

28. The method of claim 22, Wherein the general computing system further comprises a general system processor and a power management unit, further comprising providing clocking to the general computing subsystem processor and the shared memory module.

29. The method of claim 28, Wherein the modem computing subsystem further comprises a modem subsystem processor, and wherein gating clocking further comprises gating clocking to the modem subsystem processor and to the shared memory module when modem functionality is not enabled.

30. The method of claim 22, further comprising receiving unrelated clock signals, by at least one arbitration block of the shared memory module, from the general computing subsystem and the modem computing subsystem.

31. The method of claim 30, further comprising conserving power by a respective Dynamic Random Access Memory (DRAM) corresponding to an arbitration block when the memory is not clocked.

32. A portable wireless communication device, comprising:
    means for nonvolatile storage of a first binary image
    means for general computing having access to the means for nonvolatile storage;
    means for modem computing selectively enabled and disabled by the means for general computing;
    means for shared storage independently accessible by the means for general computing and the means for modem computing, the means for shared storage being selectively enabled and disabled by the means for general computing;
    wherein the means for general computing is further operable for loading the first binary image in the means for shared storage from the means for nonvolatile storage when selectively enabled, wherein the first binary image in the means for shared storage is accessible by the means for modem computing to configure the means for modem computing; and
    wherein the means for modem computing further comprises means for gating clocking within the means for modem computing subsystem and to the means for shared storage when modem functionality is not enabled.

33. A method for partitioning and loading data in a communication device, comprising:

independently accessing a first shared memory module by a general computing subsystem and a modem computing subsystem, wherein the first shared memory module and the modem computing subsystem are selectively enabled and disabled by the general computing subsystem;

loading a first binary image in the first shared memory module from a nonvolatile memory by the general computing subsystem when selectively enabled, wherein the first binary image is accessible by the modem computing system to configure the modem computing subsystem; and gating clocking within the modem computing subsystem and to the shared memory module when modem functionality is not enabled.

34. The method of claim 33, further comprising establishing a wireless communication link and monitoring a paging channel by modem computing subsystem in accordance with mobile station modem code included with the first binary memory image.

35. The method of claim 34, further comprising enabling the modem computing subsystem and the first shared memory module when the computing subsystem starts to monitor the paging channel, and disabling the modem computing subsystem and the first shared memory module when not engaged in wireless communication.

36. The method of claim 34, further comprising:

independently accessing a second shared memory module by the general computing subsystem and the modem computing subsystem;

disabling the second shared memory module by the general computing subsystem to save power; and loading a second binary memory image in the second shared memory module from the nonvolatile memory by the general computing subsystem.

37. The method of claim 36, further comprising operating a traffic channel according to mobile, station modem code included in the second binary memory image.

38. The method of claim 37, further comprising activating the second shared memory module when the modem computing subsystem operates the traffic channel, and deactivating the second memory module to save power when ceasing to operate the traffic channel.

39. The method of claim 36, further comprising receiving unrelated clock signals, by at least one arbitration block included with each of the first and second shared memory modules, from the general computing subsystem and the modem computing subsystem.

40. The method of claim 39, further comprising conserving power by at least one Dynamic Random Access Memory (DRAM) corresponding to an arbitration block when the memory is not clocked.

41. The method of claim 33, further comprising providing clocking to a general computing subsystem processor and the shared memory module by a power management unit, wherein the general computing system further comprises the general system processor and the power management unit.

42. The method of claim 41, further comprising gating the clocking to a modem subsystem processor and to the shared memory module when modem functionality is not enabled, wherein the modem computihg subsystem further comprises the modem subsystem processor.

* * * * *